United States Patent
Wang et al.

(10) Patent No.: US 9,866,498 B2
(45) Date of Patent: Jan. 9, 2018

(54) TECHNOLOGIES FOR NETWORK PACKET CACHE MANAGEMENT

(71) Applicant: Intel Corporation, Santa Clara, CA (US)

(72) Inventors: Ren Wang, Portland, OR (US); Sameh Gobriel, Hillsboro, OR (US); Christian Maciocco, Portland, OR (US); Tsung-Yuan C. Tai, Portland, OR (US); Ben-Zion Friedman, Jerusalem (IL); Hang T. Nguyen, Tempa, AZ (US); Namakkal N. Venkatesan, Hillsboro, OR (US); Michael A. O'Hanlon, Limerick (IE); Shrikant M. Shah, Chandler, AZ (US); Sanjeev Jain, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 87 days.

(21) Appl. No.: 14/580,792

(22) Filed: Dec. 23, 2014

(65) Prior Publication Data
US 2016/0182351 A1    Jun. 23, 2016

(51) Int. Cl.
*H04L 12/757* (2013.01)
*H04L 29/08* (2006.01)
*H04L 12/931* (2013.01)
*H04L 12/741* (2013.01)

(52) U.S. Cl.
CPC ............ *H04L 49/00* (2013.01); *H04L 45/745* (2013.01)

(58) Field of Classification Search
USPC ........................................ 709/223, 216, 204
See application file for complete search history.

(56) References Cited

U.S. PATENT DOCUMENTS

| | | | | |
|---|---|---|---|---|
| 6,295,598 B1* | 9/2001 | Bertoni | ............... | G06F 12/0826 711/E12.031 |
| 6,564,315 B1* | 5/2003 | Keller | ................... | G06F 9/3836 712/214 |
| 7,526,607 B1* | 4/2009 | Singh | .................. | G06F 12/0804 711/118 |

(Continued)

FOREIGN PATENT DOCUMENTS

| | | |
|---|---|---|
| JP | 2007-529917 | 10/2007 |
| JP | 2010-123130 | 6/2010 |

(Continued)

OTHER PUBLICATIONS

Office Action of Japan Patent Office for Patent Application No. 2015-227804 dated Nov. 29, 2016, 2 pages.

(Continued)

*Primary Examiner* — Jude Jean Gilles
(74) *Attorney, Agent, or Firm* — Barnes & Thornburg LLP

(57) ABSTRACT

Technologies for identifying a cache line of a network packet for eviction from an on-processor cache of a network device communicatively coupled to a network controller. The network device is configured to determine whether a cache line of the cache corresponding to the network packet is to be evicted from the cache based on a determination that the network packet is not needed subsequent to processing the network packet, and provide an indication that the cache line is to be evicted from the cache based on an eviction policy received from the network controller.

25 Claims, 5 Drawing Sheets

(56) References Cited

U.S. PATENT DOCUMENTS

| | | |
|---|---|---|
| 8,868,838 B1 | 10/2014 | Glasco |
| 2004/0162949 A1* | 8/2004 | Scott .................. G06F 12/0813 711/141 |
| 2005/0172091 A1* | 8/2005 | Rotithor ............... G06F 13/161 711/157 |
| 2006/0104268 A1* | 5/2006 | Lee ........................ H04L 45/00 370/389 |
| 2007/0008989 A1* | 1/2007 | Joglekar ................ H04L 69/18 370/469 |
| 2007/0073976 A1* | 3/2007 | Chitlur ................... H04L 49/90 711/135 |
| 2010/0199048 A1* | 8/2010 | Cypher .............. G06F 12/0817 711/141 |
| 2011/0228674 A1 | 9/2011 | Pai |
| 2014/0040518 A1* | 2/2014 | Udipi .................. G06F 13/1605 710/117 |
| 2014/0219283 A1* | 8/2014 | Park ....................... H04L 49/25 370/392 |
| 2015/0127911 A1* | 5/2015 | Steiss .................. G06F 12/0871 711/123 |
| 2016/0182351 A1* | 6/2016 | Wang ..................... H04L 49/00 709/223 |
| 2017/0149926 A1* | 5/2017 | Wang .................. H04L 67/2852 |

FOREIGN PATENT DOCUMENTS

| | | |
|---|---|---|
| JP | 2011-198360 | 10/2011 |
| WO | 2005081855 | 9/2005 |

OTHER PUBLICATIONS

Translation of Office Action of Japan Patent Office for Patent Application No. 2015-227804 dated Nov. 29, 2016, 2 pages.

\* cited by examiner

TECHNOLOGIES FOR NETWORK PACKET CACHE MANAGEMENT

BACKGROUND

Modern computing devices have become ubiquitous tools for personal, business, and social uses. As such, many modern computing devices are capable of connecting to various data networks, including the Internet and corporate intranets, to retrieve and transmit/receive data communications over such networks. To facilitate communications between computing devices, networks typically include one or more network devices (e.g., a network switch, a network router, etc.) to route communications from one computing device to another.

Software-defined networking (SDN) is a networking architecture that may be used to facilitate communications (i.e., the flow of network packets) across the network using network devices. In a software-defined network, an externally located SDN controller is connected to the network to make the network traffic flow logic decisions for the network packets across the network, a task traditionally performed at the network device level. As such, network packet processing (e.g., network traffic flow logic) previously performed on dedicated network processors of the network devices may now be processed on network devices with general purpose processors, thereby reducing the complexity of the hardware components necessary for network devices deployed in a software-defined network. Certain network packet payloads, or workload types, may be associated with certain network packets having a very large working size and/or that are only processed once after a header update (i.e., no cache reuse). Such network packets may be network or bandwidth intensive, which may result in poor performance of the network device in processing the network packets using the general purpose processor.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
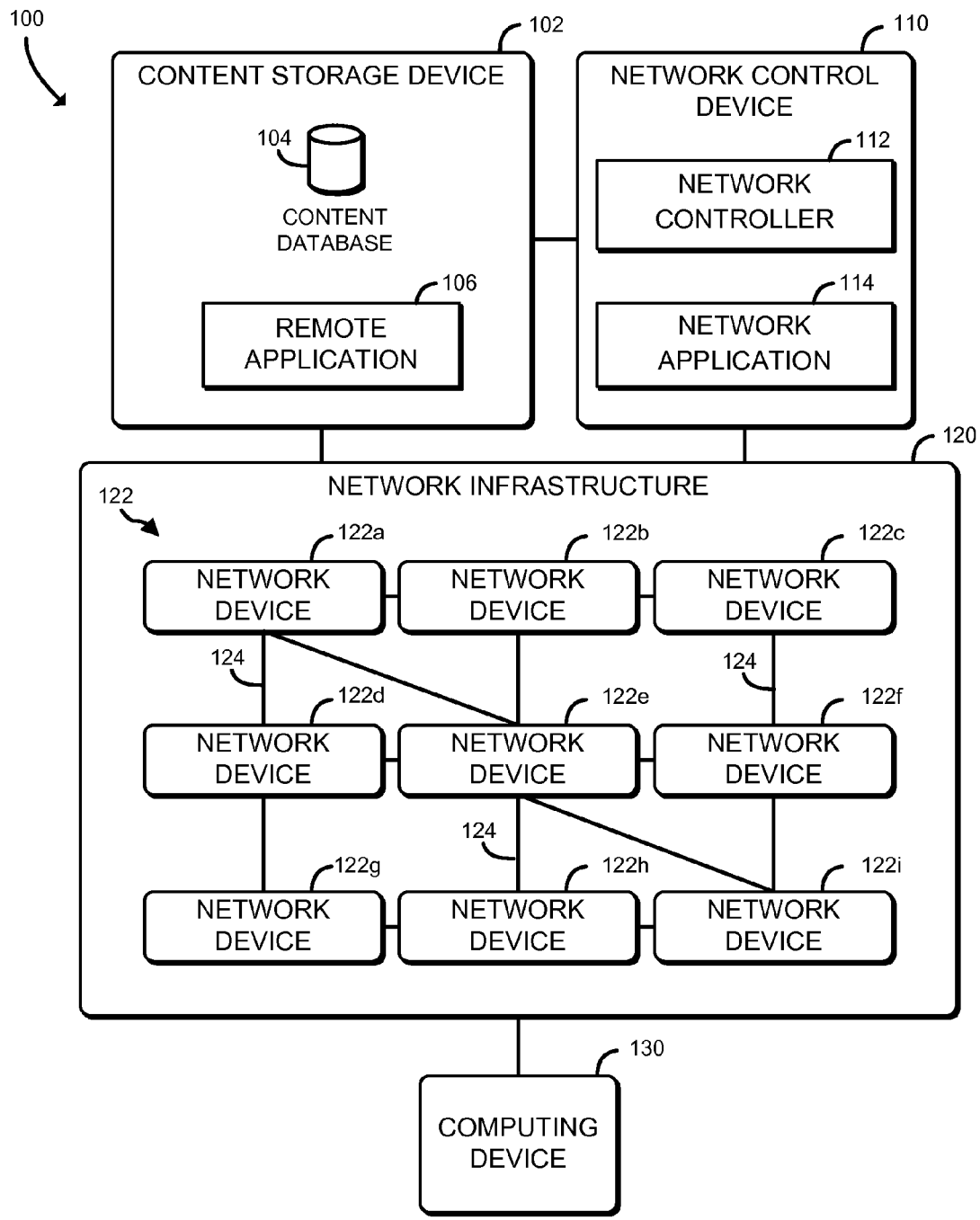
FIG. 1 is a simplified block diagram of at least one embodiment of a system for routing communications.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system or network 100 for network device flow lookup management includes a content storage device 102 connected to a network control device 110 and a network infrastructure 120. Each of the network control devices 110 and the network infrastructure 120 may be capable of operating in a software-defined networking (SDN) architecture and/or a network functions virtualization (NFV) architecture. The network infrastructure 120 includes at least one network device 122, illustratively represented as 122a-122h and collectively referred to herein as network devices 122, for facilitating the transmission of network packets between the content storage device 102 and one or more computing devices 130 via network communication paths 124 of the network infrastructure.

In use, as described in further detail below, a network device 122 receives a network packet from either the content storage device 102 or the computing device 130, processes the network packet based on policies stored at the network device 122, and forwards the network packet to the next computing device (e.g., another network device 122, the computing device 130, the content storage device 102, etc.) in the transmission path. To know which computing device is the next computing device in the transmission path, the network device 122 performs a lookup operation to determine a network flow. The lookup operation performs a hash on a portion of the network packet and uses the result to check against a flow lookup table (i.e., a hash table that maps to the network flows).

Typically, the flow lookup table is stored in an on-processor cache (e.g., a last level cache of the processor) to reduce the latency of the lookup operation, while the network flows are stored in memory of the network device 122. However, flow lookup tables may become very large, outgrowing the space available in the on-processor cache. As such, cache lines corresponding to network flow hash entries are evicted to the memory of the network device 122, which introduces latency into the lookup operation when those portions of the flow lookup table include the cache line that corresponds to the network packet. Additionally, which cache lines are evicted to memory is controlled by the network device based on whichever cache eviction algorithm is employed by the network device 122.

However, certain network packets, such as streaming network packets, are only read/processed one time and are not required for subsequent processing thereafter. As such, the cache lines corresponding to such single read network packets may be discarded after processing. For example, a cache line that corresponds to a network packet that may be discarded after processing may be marked with in indication or placed in a particular location in the on-processor cache as to identify the cache line as being the next cache line evicted from the on-processor cache during cleanup of the on-processor cache. Further, the marked, placed, or otherwise identified cache line is identified as a cache line that may be discarded upon eviction, as opposed to being saved to the memory of the network device 122. As such, unnecessary cache lines are not stored in the flow lookup tables of the network devices 122, which may improve the latency associated with the lookup operation, as the flow lookup tables are likely to have more space to allocate to network flows that will be used again.

The network infrastructure 120 may be embodied as any type of wired or wireless communication networks, including cellular networks (e.g., Global System for Mobile Communications (GSM)), digital subscriber line (DSL) networks, cable networks, telephony networks, local or wide area networks, global networks (e.g., the Internet), or any combination thereof. Additionally, the network infrastructure 120 may include any number of additional devices as needed to facilitate communication between the respective devices.

In use, network packets are transmitted between the content storage device 102 and the computing device 130 along a set of network communication paths 124 interconnecting the network devices 122 based on a network flow, or packet flow. As noted previously, the network flow is used by each network device 122 to indicate where to send received network packets after processing (i.e., along which network communication paths 124). The network communication paths 124 may be embodied as any type of wired or wireless signal paths capable of facilitating communication between the respective devices. For example, the network communication paths 124 may be embodied as any number of wires, printed circuit board traces, via bus, point-to-point interconnects, intervening devices, and or the like. Any suitable communication protocol (e.g., TCP/IP) may be used to effect transmission of the network packets along the network communication paths 124, depending on, for example, the particular type or configuration of the content storage device 102, the computing device 130, and the network devices 122.

The network devices 122 may be embodied as any type of devices capable of facilitating communications between the content storage device 102 and the computing device 130, such as routers, switches, servers, and the like. In some embodiments, such as in NFV architecture, one or more of the network devices 122 may run one or more virtual machines (VMs) to implement the physical network functions of the network device 122 in software. In other words, some of the functions performed by the network devices 122 may be virtualized. In some embodiments, the network devices 122 may be embodied as general purpose computing devices (i.e., no appliance specific hardware).

It should be appreciated that the illustrative arrangement of the network communication paths 124 is intended to indicate there are multiple options (i.e., routes) for a network packet to travel within the network infrastructure 120, and should not be interpreted as a limitation of the illustrative network infrastructure 120. For example, a network packet travelling from the network device 122a to the network device 122e may be assigned a network flow directly from the network device 122a to the network device 122e. In another example, under certain conditions, such as a poor quality of service (QoS) over the network communication path 124 between the network device 122a and the network device 122e, that same network packet may be assigned a network flow instructing the network device 122a to transmit the network packet to the network device 122b, which in turn may be assigned a network flow instructing the network device 122b to further transmit the network packet to the network device 122e.

Network packet management information (e.g., the network flow, policies corresponding to network packet types, etc.) is managed by a network application 114 and provided to a network controller 112 running on the network control device 110. In order for the network application 114 to effectively manage the network packet management information, the network controller 112 provides an abstraction of the network infrastructure 120 to the network applications 114. In some embodiments, the network controller 112 may update the network packet management information based on a quality of service (QoS) corresponding to a number of available network flows or a policy associated to a particular workload type of the network packet. For example, the computing device 130 may send a request to the content storage device 102 requesting that the content storage device 102 provide a video stream for playback on the computing device 130. The content storage device 102, after receiving the request, then processes the request and provides a network packet including data (i.e., payload data, overhead data, etc.) corresponding to content of the requested video stream to one of the network devices 122. At the receiving network device 122, the received network packet is processed before updating a header of the processed network packet. The receiving network device 122 then transmits the processed network packet to a target device according to the network flow provided by the network controller 112. The target device may be another network device 122 or the computing device 130 that initiated the request, depending where the receiving network device 122 resides in the network infrastructure 120.

Certain network packets, such as network routing packets and audio/video streaming packets, may have a working set with a potentially unlimited size and/or a workload type that is a network-intensive workload (e.g., streaming workload type) typically not used again by the network device 122 after the network device 122 processes the network packet. Such network packets can take up large portions of priority data storage locations (i.e., cache) of the network device 122, which may result in a decrease in performance of the network device 122, even though the network packets will not be utilized again once they have been rendered. Accordingly, storing such network packets may not be required, and those network packets may be discarded by the network device 122 after processing. Of course, some network packets of such type may need to be stored for future processing.

For example, writing data corresponding to network packets to the memory 208 that are never again needed by the processor 202 can have a negative energy impact. Further, in network devices 122 using certain cache replacement algorithms, such as the LRU cache replacement algorithm, the network packet may be marked as the most recently used (MRU), which may result in the network packet not being evicted from the LLC for an extended period of time (i.e., cache pollution). Further still, because large portions of the LLC are being used to store such network packets with a large working set size that are not again going to be used again, accesses may be necessarily made to the memory 208 for data that could have otherwise been residing in the LLC, but for the space being occupied by such network packets. Additional negative effects may include high memory bandwidth usage, latency, and interconnect congestion.

The content storage device 102 may be embodied as any type of storage device capable of storing content and communicating with the network control device 110 and the network infrastructure 120. In some embodiments, the content storage device 102 may be embodied as any type of computation or computer device capable of performing the functions described herein, including, without limitation, a computer, a multiprocessor system, a server, a computing server (e.g., database server, application server, web server, etc.), a rack-mounted server, a blade server, a laptop computer, a notebook computer, a network appliance, a web appliance, a distributed computing system, a processor-based system, and/or a network-attached storage (NAS) device. The content storage device 102 may include any type of components typically found in such devices such as processor(s), memory, I/O subsystems, communication circuits, and/or peripheral devices. While the system 100 is illustratively shown having one content storage device 102, it should be appreciated that networks including more than one content storage device 102 are contemplated herein. The content database 104 may be any type of database capable of storing data retrievable by a remote application 106.

The illustrative content storage device 102 includes a content database 104 and the remote application 106. The remote application 106 may be embodied as any type of application capable of transmitting and receiving data to the computing device 130 via the network devices 122 of the network infrastructure 120. In some embodiments, the remote application 106 may be embodied as a web application (i.e., a thin application) or a private, public, or hybrid cloud-based application.

While the illustrative system 100 includes a single remote application 106, it should be appreciated that more than one remote application 106 may be running, or available, on the content storage device 102. It should be further appreciated that, in certain embodiments, more than one content storage device 102 may have more than one instance of the remote application 106 of the same type running across one or more of the content storage devices 102, such as in a distributed computing environment.

The network control device 110 may be embodied as any type of computing device capable of executing the network controller 112, facilitating communications between the content storage device 102 and the network infrastructure 120, and performing the functions described herein. For example, the network control device 110 may be embodied as, or otherwise include, a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing or networking device. As such, the network control device 110 may include devices and structures commonly found in a network control device or similar computing devices such as processors, memory devices, communication circuitry, and data storages, which are not shown in FIG. 1 for clarity of the description.

The network controller 112 may be embodied as, or otherwise include, any type of hardware, software, and/or firmware capable of controlling the network flow of the network infrastructure 120. For example, in the illustrative embodiment, the network controller 112 is capable of operating in a software-defined networking (SDN) environment (i.e., an SDN controller) and/or a network functions virtualization (NFV) environment (i.e., an NFV manager and network orchestrator (MANO)). As such, the network controller 112 may send (e.g., transmit, etc.) network flow information to the network devices 122 capable of operating in an SDN environment and/or a NFV environment. In an SDN architecture, an SDN network controller serves as a centralized network management application that provides an abstracted control plane for managing configurations of the network devices 122 from a remote location.

In use, the network controller 112 is configured to provide policy information to the network devices 122 as discussed in more detail below. The policy information may include instructions (e.g., network flow-based instructions, memory management instructions, etc.) for the network devices 122 to use after processing the network packets and when evicting data corresponding to the network packets from the cache 204. The policy information may be based on network packet type, such as, for example, a network packet with a streaming workload type that will not be reused by the network device 122 after processing. As will be described in further detail below, the network devices 122 make packet processing decisions based on the policy information (e.g., evicting a network packet from memory deemed to not be subsequently needed).

The network application 114, commonly referred to in SDN networks as a business application, may be embodied as any type of network application capable of dynamically controlling the process and flow of network packets through the network infrastructure 120. For example, the network application 114 may be embodied as a network virtualization application, a firewall monitoring application, a user identity management application, an access policy control application, and/or a combination thereof. The network application 114 is configured to interface with the network controller 112, receive packets forwarded to the network controller 112, and manage the network flows provided to the network devices 122.

In use, the network application 114 receives an abstract model of the topology of the network infrastructure 120 and adapts behavior of the network devices 122 of the network infrastructure 120. For example, the behavior adapted may be a change of the network flow. In some embodiments, changed network flow may be based on requirements of the remote application 106, commonly referred to as a reactive network flow. As will be described in further detail below, in some embodiments, the network application 114 may be an SDN application or other compute software or platform capable of operating on an abstraction of the system 100 via an application programming interface (API). In some embodiments, such as where the network application 114 is an SDN application, the network application 114 may provide network virtualization services, such as virtual firewalls, virtual application delivery controllers, and virtual load balancers.

The computing device 130 may be configured to transmit and/or receive network packets to/from the remote application 106 via the network devices 122. The computing device 130 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the computing device 130 may include devices and structures commonly found in computing devices such as processors, memory devices, communication circuitry, and data storages, which are not shown in FIG. 1 for clarity of the description.

Figure 2:
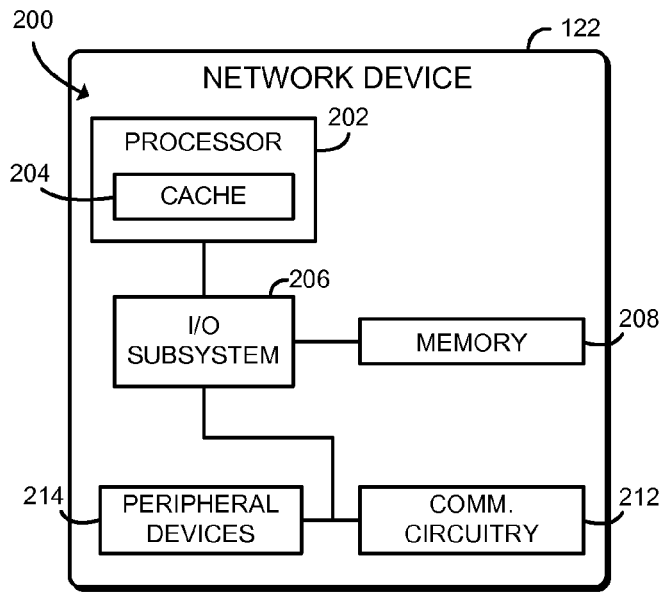
FIG. 2 is a simplified block diagram of at least one embodiment of a network device of a network infrastructure of the system of FIG. 1.

Referring now to FIG. 2, an illustrative network device 122 includes a processor 202 with an on-die cache 204, a memory 208, an input/output (I/O) subsystem 206, communication circuitry 212, and one or more peripheral devices 214. The network device 122 may be embodied as any type of computation or computer device capable of performing the functions described herein, including, without limitation, a general purpose computing device, a network appliance (e.g., physical or virtual), a web appliance, a router, a switch, a multiprocessor system, a server (e.g., stand-alone, rack-mounted, blade, etc.), a distributed computing system, a processor-based system, a desktop computer, a laptop computer, a notebook computer, a tablet computer, a smartphone, a mobile computing device, a wearable computing device, a consumer electronic device, or other computer device.

In use, as will be described in further detail below, when one of the network devices 122 receives the network packet, the network packet is either written to the memory 208 (i.e., main memory) of the network device 122 or to the on-die cache 204 of the processor 202 of the network device 122 via the I/O subsystem 206. In an embodiment where the network packet is written directly to the on-die cache 204, such as in a data direct I/O (DDIO) embodiment, the on-die cache 204 is the primary destination for the network packet, rather than the memory 208. In such embodiments, the network packet is typically written to the memory 208 of the network device 122 when the network packet is evicted from the on-die cache 204.

The processor 202 may be embodied as any type of processor capable of performing the functions described herein. For example, the processor 202 may be embodied as a single or multi-core processor(s), digital signal processor, microcontroller, or other processor or processing/controlling circuit. The memory 208 may be embodied as any type of volatile or non-volatile memory or data storage capable of performing the functions described herein. In operation, the memory 208 may store various data and software used during operation of the network device 122. The memory 208 is communicatively coupled to the processor 202 via the I/O subsystem 206, which may be embodied as circuitry and/or components to facilitate input/output operations with the processor 202, the memory 208, and other components of the network device 122. The I/O subsystem 206 is configured to facilitate the transfer of data to the on-die cache 204 and the memory 208. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations and the transfer of data to the on-die cache 204 and the memory 208. In some embodiments, the I/O subsystem 206 may form a portion of a system-on-a-chip (SoC) and be incorporated, along with the processor 202, the memory 208, and other components of the network device 122, on a single integrated circuit chip.

In some embodiments, the on-die cache 204 may have a multi-level architecture. In such embodiments, the network packet typically gets evicted from the lowest level of the on-die cache 204 to the highest level of the on-die cache 204, commonly referred to as last-level cache (LLC). When the network packet is evicted from the highest level of the on-die cache 204 (i.e., the LLC), it is typically written to the memory 208. Due to the network packet being written directly to the on-die cache 204, a copy of the network packet does not reside in the memory 208. As such, a cache line corresponding to the network packet is typically "marked" as "dirty" upon being written to the LLC of the cache 204 to indicate that the cache line needs to be written to the memory 208 when the cache line is evicted from the LLC.

Eviction of the cache line from the LLC of the cache 204 may be based on a cache replacement algorithm, also commonly referred to as a replacement policy or cache algorithm, to determine which data to store in the on-die cache 204 and which data to evict to the memory 208. A typical cache replacement algorithm relies on hardware of the network device 122 to determine which cache lines to evict. For example, a least recently used (LRU) cache replacement algorithm evicts the least recently used cache line first, regardless of the importance of the data stored in the cache line. Such cache replacement algorithms using hardware predictions to determine which cache line to evict may be error prone and even small errors can result in coherency violations and cache pollution, to name just a couple negative effects. As described previously, the network devices 122 makes packet processing decisions based on the policy information received from the network controller 112. For example, cache management policies received from the network controller 112 may be used by the network device 122 to determine whether, upon the network packets being evicted from LLC, to write the network packets to the memory 208, or to discard the network packets without writing the network packets to the memory 208.

The communication circuitry 212 may be embodied as any communication circuit, device, or collection thereof, capable of enabling communications between the content storage device 102, the network control device 110 and other network devices 122 over a network. The communication circuitry 212 may be configured to use any one or more communication technologies (e.g., wireless or wired communications) and associated protocols (e.g., Ethernet, Bluetooth®, Wi-Fi®, WiMAX, etc.) to effectuate such communication. In some embodiments, the communication circuitry 212 includes cellular communication circuitry and/or other long-ranged wireless communication circuitry. The one or more peripheral devices 214 may include any type of peripheral device commonly found in a computing device, and particularly a network device, such as a hardware keyboard, input/output devices, peripheral communication devices, and/or the like, for example. It is contemplated herein that the peripheral devices 214 may additionally or alternatively include one or more ports for connecting external peripheral devices to the network device 122, such as USB, for example.

Figure 3:
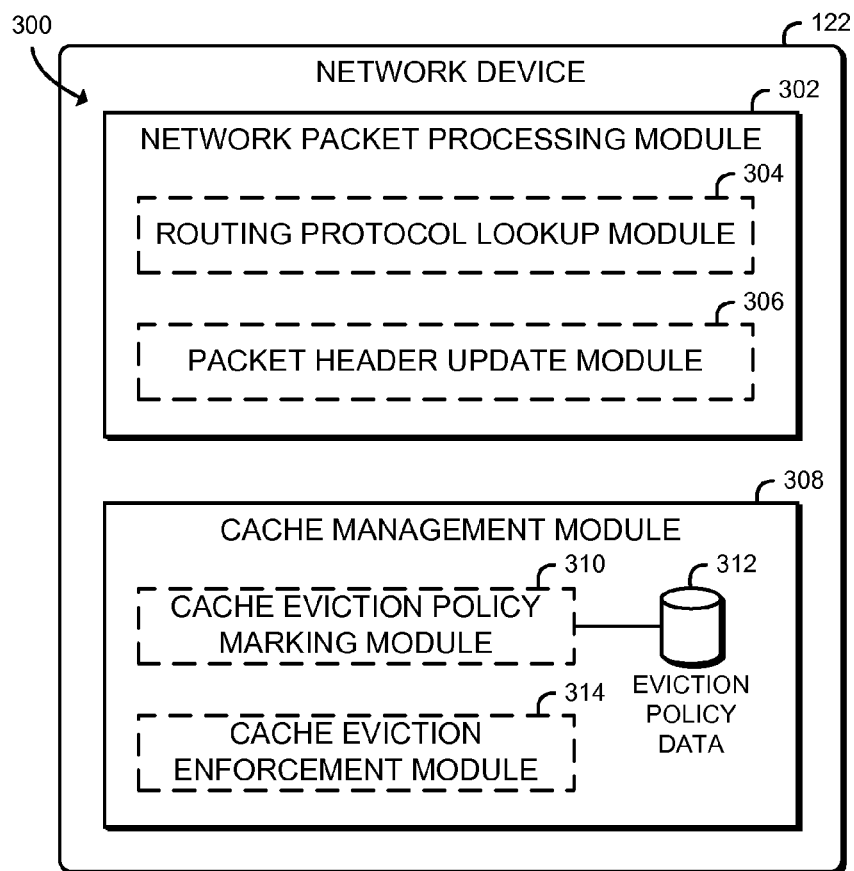
FIG. 3 is a simplified block diagram of at least one embodiment of an environment of the network device of FIG. 2.

Referring now to FIG. 3, in use, each of the network devices 122 establishes an environment 300 during operation. The illustrative environment 300 includes a network packet processing module 302 and a cache management module 308. The cache management module 308 includes eviction policy data 312 received from the network controller 112. In some embodiments, the eviction policy data 312 may include cache eviction policies corresponding to network packet types. The various modules of the environment 300 may be embodied as hardware, firmware, software, or a combination thereof. For example the various modules, logic, and other components of the environment 300 may form a portion of, or otherwise be established by, the processor 202 or other hardware components of the network devices 122. As such, in some embodiments, one or more of the modules of the environment 300 may be embodied as a circuit or collection of electrical devices (e.g., a network packet processing circuit, a cache management circuit, etc.). It should be appreciated that each network device 122 may include other components, sub-components, modules, and devices commonly found in a computing device, which are not illustrated in FIG. 3 for clarity of the description. Additionally, it should be understood that although each of the network devices 122 may establish the illustrative environment 300 during operation, the following discussion of that illustrative environment 300 is described with specific reference to a single network device 122 for clarity of the description.

The network packet processing module 302 is configured to receive and process network packets from the content storage device 102, another network device 122, and/or the computing device 130. In some embodiments, the network packet processing module 302 may include a routing protocol lookup module 304 and/or a packet header update module 306. The routing protocol lookup module 304 is configured to perform a lookup operation to determine which routing protocol to use to process the network packet upon the network packet being received at the LLC from the I/O subsystem 206. In some embodiments, performing the lookup operation may include looking up the routing protocol in a lookup table of the network device 122. The routing protocol used to process the network packet may be used by the cache management module 308 to determine a cache eviction policy to apply to the network packet, which is described in further detail below. The packet header update module 306 is configured to update a header of the network packet. The updated header may include, for example, updated flow information.

The cache management module 308 is configured to receive the cache eviction policy instructions from the network controller 112. The cache eviction policy instructions are stored as eviction policy data 312 to be used by the network device 122 to determine whether to "mark" certain network packets after the network packets are processed. In some embodiments, the eviction policy data 312 may include a set of instructions indicating how the network device 122 is to "mark" certain network packets stored in the LLC based on network packet type and/or the routing protocol used to process the network packet. For example, the set of instructions may instruct the network device 122 to "mark" streaming packets for identified workload types that will not be reused by the network device 122 after processing to ensure they are discarded directly after being processed. It should be appreciated that the eviction policy data 312 may include any other type of information corresponding to a particular cache eviction policy.

In some embodiments, the cache management module 308 may include a cache eviction policy marking module 310 and/or a cache eviction enforcement module 314. The cache eviction policy marking module 310 is configured to determine which cache eviction policy should be applied to the network packet and to apply the cache eviction policy to the network packet, if applicable. The cache eviction policy marking module 310 may compare the identified workload type of the network packet and/or the routing protocol against the eviction policy data 312 to determine which cache eviction policy should be applied to the network packet. As will be described in further detail below, the cache eviction policy marking module 310 may then "mark" the network packet upon determining the cache eviction policy that should be applied to the network packet.

The cache eviction enforcement module 314 is configured to enforce the cache eviction policy applied to a "marked" cache line upon eviction of the cache line from the LLC. Based on the cache eviction policy applied to the cache line, upon eviction of the cache line from the LLC, the cache eviction enforcement module 314 may write the cache line back to the memory 208 or discard the cache line without writing the cache line back to the memory 208.

Figure 4:
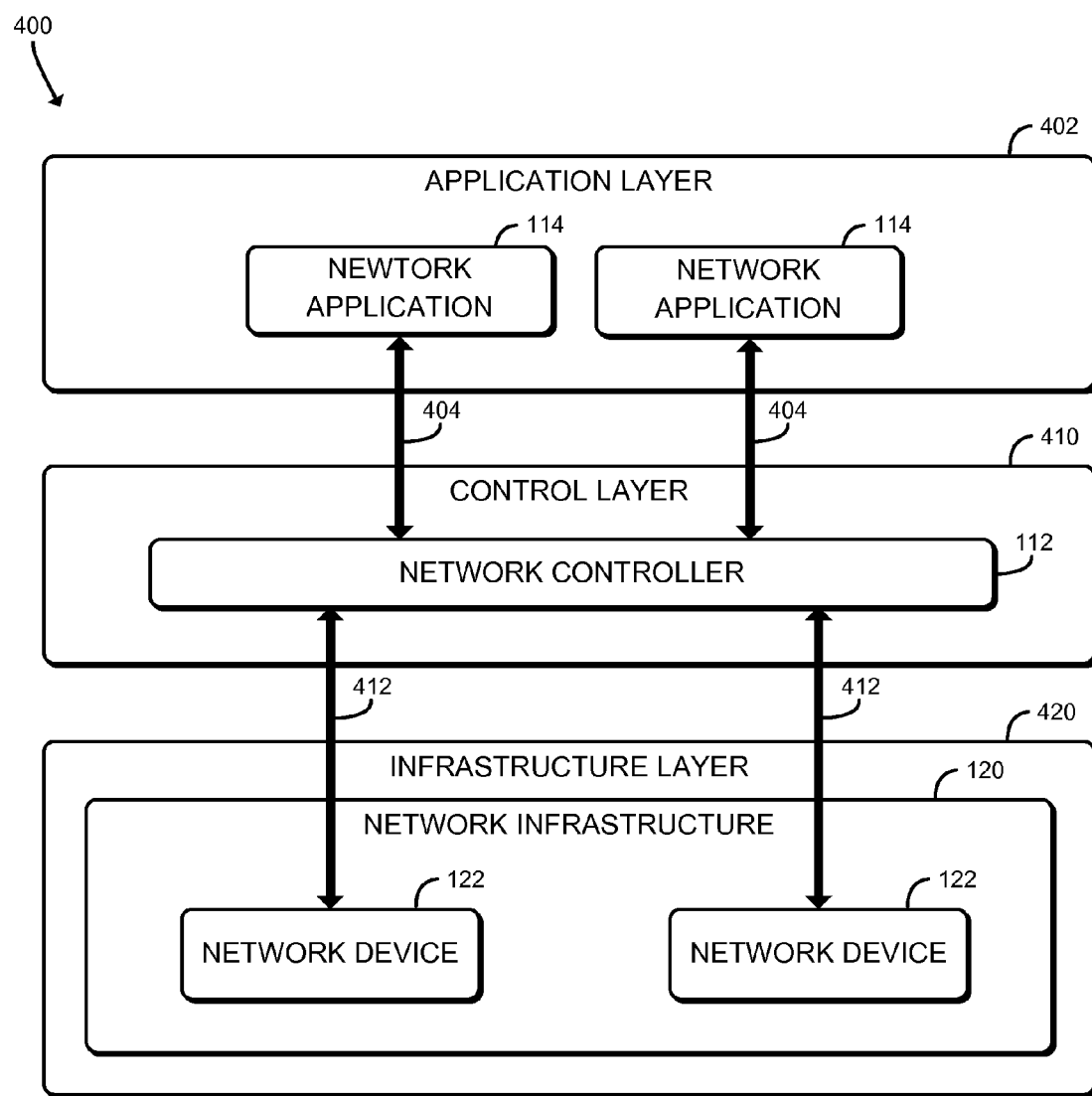
FIG. 4 is a simplified block diagram of at least one embodiment of a software defined network architecture of the system of FIG. 1.

Referring now to FIG. 4, an illustrative embodiment of an SDN architecture 400, which may be implemented by the system 100, includes an application layer 402, a control layer 410, and an infrastructure layer 420. The application layer 402 may include one or more network applications 114 and the infrastructure layer 420 may include one or more network devices 122. In SDN architecture embodiments, the system 100 is generally an application defined networking (ADN) network. Accordingly, the network applications 114 control the behavior of the network devices 122 in the ADN network. To do so, the network applications 114 communicate their requirements to the network controller 112 and receive feedback from the network controller 112 via northbound APIs 404. In some embodiments, the requirements may be based on requirements of the remote application 106 and/or a network packet type. The northbound APIs 404 provide a network abstraction interface to allow the network applications 114 of the application layer 402 to communicate information, including network packet flow and policy information, to the network controller 112 of the control layer 410. The information received at the network controller 112 is passed through southbound APIs 412 to define and control the behavior of the network devices 122.

Figure 5:
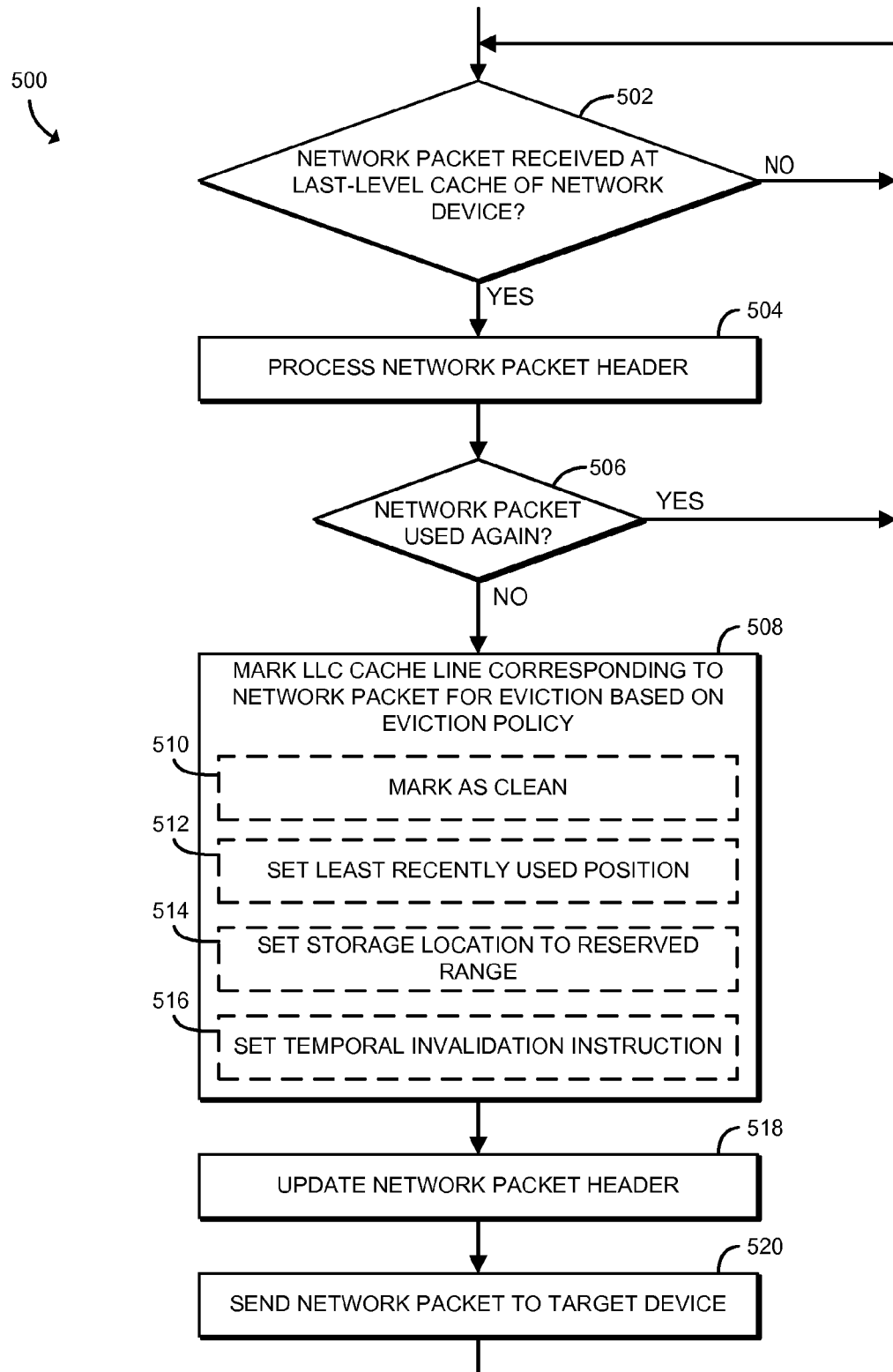
FIG. 5 is a simplified flow diagram of at least one embodiment of a method for managing cache eviction policies of the network device of FIG. 2.

Referring now to FIG. 5, in use, one or more of the network devices 122 may execute a method 500 for identifying network packets for eviction from the cache 204. In other words, identifying network packets that will not be written to the memory 208 upon eviction from the cache 204. The method 500 begins in block 502, in which the network device 122 determines whether a network packet was received at the LLC of the cache 204 of the network device 122. If not, the method 500 loops back to block 502 to determine whether a network packet has been received. If a network packet was received at the LLC of the cache 204 of the network device 122, a header of the network packet is processed at block 504. Processing the header of the network packet may include any type of packet processing including, for example, performing a hash function on at least a portion of the header, extracting key fields, and/or performing a lookup to determine a flow corresponding to the network packet type. In some embodiments, the packet flow may be determined based on a routing table, the contents of which may be populated based on instructions received from the network controller 112. The instructions received from the network controller 112 may be based on any criteria or aspect of the network infrastructure such as the current level of network activity on the network infrastructure 120, an amount and/or type of network devices 122 residing in the network infrastructure 120, a present configuration of the network devices 122 in the network infrastructure 120, and/or the remote application 106 from which the network packets are derived, a workload type associated with the network packet, and/or other network infrastructure 120 and/or network packet defining characteristics.

In block 506, the network device 122 determines whether data (i.e., payload data, overhead data, etc.) corresponding to the network packet is going to be used again by the processor 202 of the network device 122. The network device 122 may make such a determination based on any suitable data. For example, in an illustrative embodiment, the network device 122 may base the determination on the workload type of the network packet (e.g., streaming workload, transaction workload, etc.). Based on the workload type, the network device 122 may perform a lookup to determine a likelihood of reuse (i.e., accessed again subsequent to being processed). Additionally, the instructions received from the network controller 112 may include the likelihood of subsequent access for a particular workload type and an eviction policy to be applied to the network packet written to the LLC of the network device 122 based on the workload type. For example, certain workload types, such as network routing workloads and audio/video streaming workloads are likely not to be used again after processing (i.e., not reused by the processor 202). Consequently, the network controller 112 may provide an instruction to the network device 122 that such network packets will not be reused.

Figure 7:
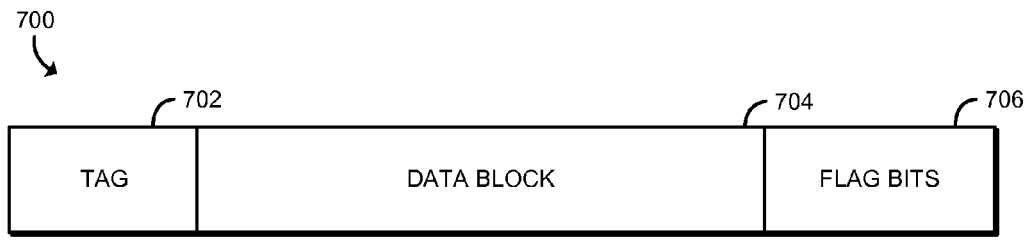
FIG. 7 is a simplified block diagram of at least one embodiment of a structure of the cache line of FIG. 5.

As noted previous, the instruction received by the network device 122 from the network controller 112 may include an eviction policy. The eviction policy may include how to "mark" particular cache lines written to the LLC, in particular those cache lines corresponding to workload types that will not be reused by the processor 202 of the network device 122 after processing. For example, an illustrative cache line 700 is shown in FIG. 7. The cache line 700 includes a tag 702, a data block 704, and one or more flag bits 706. The tag 702 typically contains an address corresponding to a location in the memory 208 where the actual data resides. When a network packet is received directly into the LLC of the cache 204, there is no address to a location in the memory 208, since data corresponding to the network packet was not copied from the memory 208. The data block 704 typically contains the actual data fetched from the memory 208 (i.e., actual data corresponding to the network packet received directly into the LLC). The flag bits 706 of the cache line 700 are typically set to a "clean" or "dirty" state to indicate whether the data block 704 of the cache line 700 is to be written to the memory 208 when the cache line 700 is evicted from the LLC of the cache 204. In a case where the flag bit 706 is set to "clean," the cache line 700 will not be written to the memory 208 (i.e., discarded) when the cache line 700 is evicted from the LLC of the cache 204. Alternatively, in a case where the flag bit 706 of a cache line 700 is set to "dirty," the cache line 700 will be written to the memory 208 when the cache line 700 is evicted from the LLC of the cache 204. Due to the cache line 700 being the most recently accessed cache line in the LLC of the cache 204, it is typically put in the MRU position. In some embodiments, such as those embodiments where the network device 122 implements the LRU cache replacement algorithm, the cache line 700 may become stale in the LLC of the cache 204, as the cache line 700 does not get evicted from the LLC of the cache 204 directly after processing. Under such conditions, the now stale cache line 700 continues to use up valuable space in the LLC of the cache 204 until it is eventually evicted, and in the interim causing in cache pollution, latency, and an overall decrease in cache performance. It should be appreciated that a cache line may have a different structure than the illustrative cache line 700. A cache line having a different structure may include additional and/or alternative cache line bits, blocks, tags, and/or the like.

Referring back to FIG. 5, if the data corresponding to the network packet is to be used again, the method 500 loops back to block 502 in which the network device 122 continues to monitor for network packets received at the LLC of the cache 204. If, however, the data corresponding to the network packet is not to be used again, the method advances to block 508. In block 508, the network device 122 "marks" a cache line corresponding to the network packet in the LLC of the cache 204 based on the instruction received from the network controller 112. In this way, the network device 122 makes cache management decisions based on the cache eviction policy received from the network controller 112, rather than hardware determinations made solely on the cache replacement algorithm, reducing the potential for negative effects on cache performance attributable to network packets that will not be reused after processing.

In some embodiments, as in block 510, "marking" the cache line corresponding to the network packet may include setting a flag bit (e.g., invalid/valid bit, clean/dirty bit, etc.) of the cache line. The flag bit corresponds to a bit state (e.g., invalid, clean, etc.) of a cache line that includes data corresponding to the network packet. The flag bit indicates whether or not the cache line is to be written to the memory 208 when the cache line is evicted from the LLC of the cache 204. As noted previous, when a network packet is written directly to the LLC of the cache 204, the flag bit of the cache line is set to a "dirty" bit state (e.g., dirty, modified, valid, etc.) to indicate to the network device 122 the data block of the cache line is to be written to the memory 208 upon eviction of the cache line from the LLC of the cache 204. The network device 122 sets the flag bit 706 of the cache line from the "dirty" bit state to a "clean" bit state to indicate to the network device 122 the cache line 700 is to be discarded when the cache line is evicted from the LLC. For example, in embodiments where the network device 122 uses a cache coherence and memory coherence protocol (e.g., MESI protocol including modified, exclusive, shared, and invalid states), setting the cache line to a "clean" state may include setting two flag bits of the cache line to an invalid or exclusive state.

In some embodiments, as in block 512, "marking" the network packet may include setting an age bit of the cache line corresponding to the network packet in the LLC to indicate that the cache line is next to be discarded. As noted previous, certain workload types are not reused by the processor 202 and may not be evicted immediately after processing. Typically, when a cache line is accessed, the age bit is set to indicate the cache line was the MRU cache line. In some embodiments, such as those embodiments using an LRU cache replacement algorithm, the cache line will not be evicted until the age bit corresponds to the LRU cache line. Any amount of time cache lines that will not be reused spend in the LLC decreases cache performance. To ensure certain identified network packets do not remain in the LLC after processing, the network device 122 may set the age bit of the cache line to the LRU position to indicate that the cache line should be the next cache line evicted from the LLC.

In some embodiments, as in block 514, "marking" the network packet may include writing data corresponding to the network packet to a cache line in a reserved range of the LLC of the cache 204. As noted previous, the network device 122 receives the cache eviction policy from the network controller 112. The cache eviction policy may include a reserved range of the LLC of the cache 204 to write network packets with certain characteristics, such as workload types that are temporal (i.e., will not be accessed again after processing). In some embodiments, the reserved range may be an allocated portion of the LLC of the cache 204 to be the first cache lines of the LLC to be discarded when cache lines are evicted from the LLC of the cache 204. In some embodiments, the reserved range may be an allocated portion of the LLC of the cache 204 such that, when the cache line is written to the reserved range, a bit, such as the flag bit, is changed to indicate the cache line is in a state that is not to be written to the memory 208 after the cache line is processed.

In some embodiments, as in block 516, "marking" the network packet may include a temporal invalidation instruction, which may be saved in the eviction policy data 312, to be used by the network device 122 to invalidate one or more cache lines on cache cleanup. The temporal invalidation instruction is an instruction indicating that the cache line corresponding to the network packet in the LLC of the cache 204 is temporal and, after processing data buffers of the network device 122, the cache line should be discarded without writing the cache line to the memory 208. In some embodiments, the temporal invalidation instruction may be an instruction set architecture (ISA) instruction. For example, for data transmitted from software to a network interface controller (NIC), or network interface card/adapter, the temporal invalidation instruction indicates to the processor 202 the cache line is temporal and, after direct memory access (DMA), the cache line should be discarded.

It is contemplated that in some embodiments, "marking" the network packet may include any combination of the "marking" embodiments of the blocks 510, 512, 514, and 516. For example, marking the cache line "clean," as in block 510, and setting the age bit of the cache line to a position indicative of that cache line being the next cache line evicted, as in block 512, the cache line is positioned to be the next cache line evicted and is prevented from being written to the memory 208 when evicted. It is further contemplated that each of the "marking" embodiments of the blocks 510, 512, 514, and 516 may be performed in any order.

In block 518, the header of the network packet header is updated. Updating the network packet may include updating the network flow of the network packet to be used by a target device to which the network packet will be sent. In block 520, the network packet is sent to the target device to further process the network packet. The target device may be the computing device 130 or another network device 122 in the network infrastructure.

Figure 6:
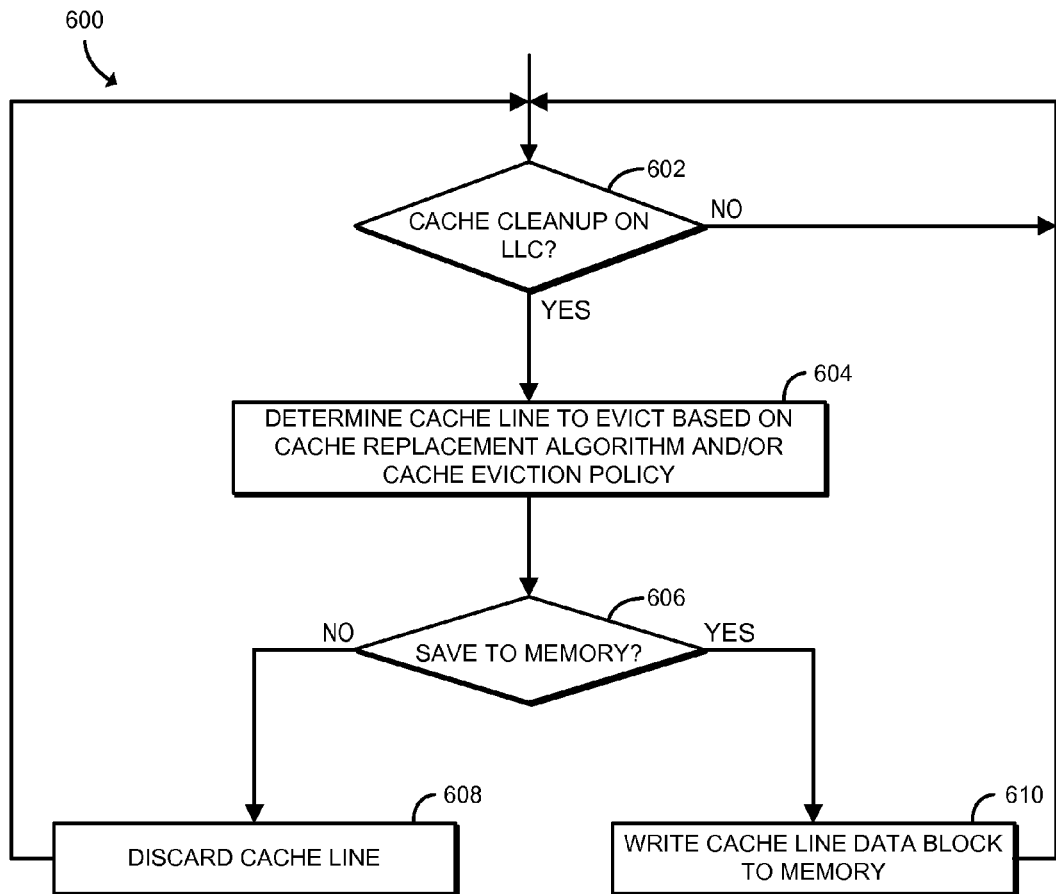
FIG. 6 is a simplified flow diagram of at least one embodiment of a method for enforcing the eviction policy of FIG. 5.

Referring now to FIG. 6, in use, the network device 122 may execute a method 600 for enforcing a cache line eviction policy that may be executed on the LLC of the cache 204. The method 600 begins in block 602, in which the network device 122 determines whether to execute cache cleanup on the LLC of the cache 204. The cache cleanup is generally executed when the LLC does not have a sufficient capacity (i.e., space) to store incoming data, at which time one or more cache line are evicted from the memory 208 until the sufficient capacity to store the incoming data is achieved. If the cache cleanup is not to be executed (i.e., sufficient space is present in the LLC to receive incoming data), then the method 600 loops back to block 602 to determine whether a cache cleanup needs executed. If the cache cleanup is to be executed, the method 600 advances to block 604.

In block 604, the network device 122 determines a cache line to evict based on the cache replacement algorithm and/or the cache eviction policy. As noted previous, the cache line may be "marked" to indicate when and/or how the cache line is to be evicted based on the cache eviction policy. In some embodiments, where the network device 122 uses a cache replacement algorithm to determine the cache line to be evicted from the LLC of the cache 204, a flag bit and/or an age bit of the cache line may be changed, based on the cache eviction polity, to manipulate which cache line is evicted from the LLC. As also noted previous, the cache line may be "marked" by writing the cache line to a particular range in the cache 204 to be evicted when the cache cleanup is executed and/or by a temporal invalidation instruction being received to indicate the cache line is to be evicted after processing, each of which are based on the cache eviction policy.

In block 606, the network device 122 determines whether the cache line determined at block 604 is to be saved to the memory 208. For example, in embodiments using the temporal invalidation instruction, the temporal invalidation instruction may be interpreted by software (e.g., TCP stack, decoding software, or the like) of the network device 122 to discard the cache line without writing the cache line to the memory 208 after the cache line has been processed. If the cache line is not to be saved to the memory 208, the method 600 advances to block 608 to discard the cache line. If the cache line is to be saved to the memory 208, the method 600 advances to block 610 to write the data block of the cache line to the memory 208. Subsequent to either discarding the cache line in block 608 or writing the data block of the cache line to the memory 208 in block 610, the method 600 loops back to block 602 to determine whether to execute cache cleanup on the LLC.

EXAMPLES

Illustrative examples of the technologies disclosed herein are provided below. An embodiment of the technologies may include any one or more, and any combination of, the examples described below.

Example 1 includes a network device for identifying a network packet for eviction, the network device comprising a processor that includes a cache, wherein the cache comprises a plurality of cache lines; a network packet processing module to receive a network packet, store the network packet in a cache line of the cache of the processor, and process the network packet; and a cache management module to determine whether the network packet is required for subsequent processing and to indicate that the cache line corresponding to the network packet is to be evicted from the cache in response to a determination that the network packet is not required for subsequent processing.

Example 2 includes the subject matter of Example 1, and wherein the determination that the network packet is not required for subsequent processing is based on an eviction policy received from a network controller communicatively coupled to the network device.

Example 3 includes the subject matter of any of Examples 1 and 2, and wherein to indicate that the cache line corresponding to the network packet is to be evicted from the cache comprises to mark the cache line with an indicator.

Example 4 includes the subject matter of any of Examples 1-3, and wherein to indicate that the cache line corresponding to the network packet is to be evicted from the cache comprises to set a flag bit of the cache line.

Example 5 includes the subject matter of any of Examples 1-4, and wherein to indicate that the cache line corresponding to the network packet is to be evicted from the cache comprises to set an age bit of the cache line.

Example 6 includes the subject matter of any of Examples 1-5, and wherein to indicate that the cache line corresponding to the network packet is to be evicted from the cache comprises to set a temporal invalidation instruction to the cache line.

Example 7 includes the subject matter of any of Examples 1-6, and wherein to indicate that the cache line corresponding to the network packet is to be evicted from the cache comprises to store the cache line at a predetermined memory range of the cache, and wherein the predetermined memory range of the cache resides in a portion of the cache that is to be discarded upon a cleanup of the cache.

Example 8 includes the subject matter of any of Examples 1-7, and wherein the determination whether the network packet is required for subsequent processing is based on a type of workload of the network packet.

Example 9 includes the subject matter of any of Examples 1-8, and wherein the type of workload comprises at least one of a network routing workload, a streaming workload, a network-intensive workload, and a single read workload.

Example 10 includes the subject matter of any of Examples 1-9, and further including an input/output (I/O) subsystem to provide the network packet received by the network device directly to the cache.

Example 11 includes the subject matter of any of Examples 1-10, and wherein the cache management module is further to discard the cache line upon eviction of the cache line from the cache.

Example 12 includes the subject matter of any of Examples 1-11, and wherein the cache comprises an on-die last-level cache.

Example 13 includes a network device for use in a software defined network environment that includes a network controller and a content storage device, the network device comprising a processor that includes a cache, wherein the cache includes a plurality of cache lines; a network packet processing module to receive a network packet from the content storage device communicatively coupled to the network device, store the network packet in a cache line, and process the network packet; and a cache management module to receive an eviction policy from the network controller communicatively coupled to the network device, determine whether the cache line corresponding to the network packet is to be evicted from the cache based on a determination that the network packet is not needed subsequent to processing the network packet, and provide an indication that the cache line is to be evicted from the cache in response to the determination that the network packet is not needed subsequent to processing the network packet.

Example 14 includes the subject matter of Example 13, and wherein to provide the indication that the cache line is to be evicted from the cache comprises to provide the indication that the cache line is to be evicted from the cache based on the eviction policy received from the network controller.

Example 15 includes the subject matter of any of Examples 13 and 14, and wherein the determination that the network packet is not needed subsequent to processing is based on a type of workload of the network packet.

Example 16 includes the subject matter of any of Examples 13-15, and wherein the type of workload of the network packet comprises at least one of a network routing workload, a streaming workload, a network-intensive workload, and a single read workload.

Example 17 includes the subject matter of any of Examples 13-16, and wherein to provide the indication comprises to set a flag bit of the cache line.

Example 18 includes the subject matter of any of Examples 13-17, and wherein to provide the indication comprises to set an age bit of the cache line.

Example 19 includes the subject matter of any of Examples 13-18, and wherein to provide the indication comprises to set a temporal invalidation instruction to the cache line.

Example 20 includes the subject matter of any of Examples 13-19, and wherein to provide the indication comprises to store the cache line at a predetermined memory range of the cache, and wherein the predetermined memory range of the cache resides in a portion of the cache that is to be discarded before other portions of the cache upon a cleanup of the cache.

Example 21 includes the subject matter of any of Examples 13-20, and wherein the cache comprises an on-die last-level cache.

Example 22 includes a method for identifying a cache line of a network packet for eviction from an on-processor cache of a network device, the method comprising receiving, by the network device, the network packet at the on-processor cache of the network device, wherein the on-processor cache comprises a plurality of cache lines; storing the network packet in the cache line of the on-processor cache; processing the network packet; and determining whether the network packet is required for subsequent processing; indicating that the cache line corresponding to the network packet is to be evicted from the on-processor cache in response to on a determination that the network packet is not required for subsequent processing.

Example 23 includes the subject matter of Example 22, and wherein the indicating that the cache line corresponding to the network packet is to be evicted from the on-processor cache comprises indicating that the cache line corresponding to the network packet is to be evicted from the on-processor cache based on an eviction policy received from a network controller communicatively coupled to the network device.

Example 24 includes the subject matter of any of Examples 22 and 23, and wherein the indicating that the cache line corresponding to the network packet is to be evicted from the on-processor cache comprises marking the cache line with an indicator.

Example 25 includes the subject matter of any of Examples 22-24, and wherein the indicating that the cache line corresponding to the network packet is to be evicted from the on-processor cache comprises setting a flag bit of the cache line.

Example 26 includes the subject matter of any of Examples 22-25, and wherein the indicating that the cache line corresponding to the network packet is to be evicted from the on-processor cache comprises setting an age bit of the cache line.

Example 27 includes the subject matter of any of Examples 22-26, and wherein the indicating that the cache line corresponding to the network packet is to be evicted from the on-processor cache comprises setting a temporal invalidation instruction to the cache line.

Example 28 includes the subject matter of any of Examples 22-27, and wherein the indicating that the cache line corresponding to the network packet is to be evicted from the on-processor cache comprises storing the cache line at a predetermined memory range of the on-processor cache, and wherein the predetermined memory range of the on-processor cache is located in a portion of the on-processor cache that is to be discarded first upon a cleanup of the on-processor cache.

Example 29 includes the subject matter of any of Examples 22-28, and wherein the determining whether the network packet is required for subsequent processing comprises determining whether the network packet is required for subsequent processing based on a type of workload of the network packet.

Example 30 includes the subject matter of any of Examples 22-29, and wherein the determining whether the network packet is required for subsequent processing comprises determining whether the network packet is required for subsequent processing based on at least one of a network routing workload, a streaming workload, a network-intensive workload, and a single read workload.

Example 31 includes the subject matter of any of Examples 22-30, and further including discarding the cache line upon eviction of the cache line from the on-processor cache based on an indication that the cache line corresponding to the network packet is to be evicted from the on-processor cache.

Example 32 includes the subject matter of any of Examples 22-31, and wherein the on-processor cache comprises an on-processor last-level cache.

Example 33 includes a computing device comprising a processor; and a memory having stored therein a plurality of instructions that when executed by the processor cause the computing device to perform the method of any of Examples 22-32.

Example 34 includes one or more machine readable storage media comprising a plurality of instructions stored thereon that in response to being executed result in a computing device performing the method of any of Examples 22-32.

Example 35 includes a computing device for identifying a cache line of a network packet for eviction from an on-processor cache of a network device, the computing device comprising means for receiving the network packet at the on-processor cache of the network device, wherein the on-processor cache comprises a plurality of cache lines; means for storing the network packet in the cache line of the on-processor cache; means for processing the network packet; and means for determining whether the network packet is required for subsequent processing; means for indicating that the cache line corresponding to the network packet is to be evicted from the on-processor cache in response to on a determination that the network packet is not required for subsequent processing.

Example 36 includes the subject matter of Example 35, and wherein the means for indicating that the cache line corresponding to the network packet is to be evicted from the on-processor cache comprises means for indicating that the cache line corresponding to the network packet is to be evicted from the on-processor cache based on an eviction policy received from a network controller communicatively coupled to the network device.

Example 37 includes the subject matter of any of Examples 35 and 36, and wherein the means for indicating that the cache line corresponding to the network packet is to be evicted from the on-processor cache comprises means for marking the cache line with an indicator.

Example 38 includes the subject matter of any of Examples 35-37, and wherein the means for indicating that the cache line corresponding to the network packet is to be evicted from the on-processor cache comprises means for setting a flag bit of the cache line.

Example 39 includes the subject matter of any of Examples 35-38, and wherein the means for indicating that the cache line corresponding to the network packet is to be evicted from the on-processor cache comprises means for setting an age bit of the cache line.

Example 40 includes the subject matter of any of Examples 35-39, and wherein the means for indicating that the cache line corresponding to the network packet is to be evicted from the on-processor cache comprises means for setting a temporal invalidation instruction to the cache line.

Example 41 includes the subject matter of any of Examples 35-40, and wherein the means for indicating that the cache line corresponding to the network packet is to be evicted from the on-processor cache comprises means for storing the cache line at a predetermined memory range of the on-processor cache, and wherein the predetermined memory range of the on-processor cache is located in a portion of the on-processor cache that is to be discarded first upon a cleanup of the on-processor cache.

Example 42 includes the subject matter of any of Examples 35-41, and wherein means for the determining whether the network packet is required for subsequent processing comprises means for determining whether the network packet is required for subsequent processing based on a type of workload of the network packet.

Example 43 includes the subject matter of any of Examples 35-42, and wherein the means for determining whether the network packet is required for subsequent processing comprises means for determining whether the network packet is required for subsequent processing based on at least one of a network routing workload, a streaming workload, a network-intensive workload, and a single read workload.

Example 44 includes the subject matter of any of Examples 35-43, and further including means for discarding the cache line upon eviction of the cache line from the on-processor cache based on an indication that the cache line corresponding to the network packet is to be evicted from the on-processor cache.

Example 45 includes the subject matter of any of Examples 35-44, and wherein the on-processor cache comprises an on-processor last-level cache.

The invention claimed is:

1. A network device for identifying a network packet for eviction, the network device comprising:

a processor that includes a cache, wherein the cache comprises a plurality of cache lines;

a network packet processing module to receive a network packet, store the network packet in a cache line of the cache of the processor, and process the network packet; and a cache management module to determine whether the network packet is required for subsequent processing and to indicate that the cache line corresponding to the network packet is to be evicted from the cache in response to a determination that the network packet is not required for subsequent processing.

2. The network device of claim 1, wherein to indicate that the cache line corresponding to the network packet is to be evicted from the cache comprises to set a flag bit of the cache line.

3. The network device of claim 1, wherein to indicate that the cache line corresponding to the network packet is to be evicted from the cache comprises to set a temporal invalidation instruction to the cache line.

4. The network device of claim 1, wherein to indicate that the cache line corresponding to the network packet is to be evicted from the cache comprises to store the cache line at a predetermined memory range of the cache, and wherein the predetermined memory range of the cache resides in a portion of the cache that is to be discarded upon a cleanup of the cache.

5. The network device of claim 1, wherein the determination whether the network packet is required for subsequent processing is based on a type of workload of the network packet.

6. The network device of claim 1, wherein the cache management module is further to discard the cache line upon eviction of the cache line from the cache.

7. The network device of claim 1, wherein the cache comprises an on-die last-level cache.

8. A network device for use in a software defined network environment that includes a network controller and a content storage device, the network device comprising:

a processor that includes a cache, wherein the cache includes a plurality of cache lines;

a network packet processing module to receive a network packet from the content storage device communicatively coupled to the network device, store the network packet in a cache line, and process the network packet; and a cache management module to receive an eviction policy from the network controller communicatively coupled to the network device, determine whether the cache line corresponding to the network packet is to be evicted from the cache based on a determination that the network packet is not needed subsequent to processing the network packet, and provide an indication that the cache line is to be evicted from the cache in response to the determination that the network packet is not needed subsequent to processing the network packet.

9. The network device of claim 8, wherein to provide the indication that the cache line is to be evicted from the cache comprises to provide the indication that the cache line is to be evicted from the cache based on the eviction policy received from the network controller.

10. The network device of claim 8, wherein the determination that the network packet is not needed subsequent to processing is based on a type of workload of the network packet.

11. The network device of claim 8, wherein to provide the indication comprises to set a flag bit of the cache line.

12. The network device of claim 8, wherein to provide the indication comprises to set a temporal invalidation instruction to the cache line.

13. The network device of claim 8, wherein to provide the indication comprises to store the cache line at a predetermined memory range of the cache, and wherein the predetermined memory range of the cache resides in a portion of the cache that is to be discarded before other portions of the cache upon a cleanup of the cache.

14. The network device of claim 8, wherein the cache comprises an on-die last-level cache.

15. A method for identifying a cache line of a network packet for eviction from an on-processor cache of a network device, the method comprising:

receiving, by the network device, the network packet at the on-processor cache of the network device, wherein the on-processor cache comprises a plurality of cache lines;

storing the network packet in the cache line of the on-processor cache;

processing the network packet; and determining whether the network packet is required for subsequent processing;

indicating that the cache line corresponding to the network packet is to be evicted from the on-processor cache in response to on a determination that the network packet is not required for subsequent processing.

16. The method of claim 15, wherein the indicating that the cache line corresponding to the network packet is to be evicted from the on-processor cache comprises indicating that the cache line corresponding to the network packet is to be evicted from the on-processor cache based on an eviction policy received from a network controller communicatively coupled to the network device.

17. The method of claim 15, wherein the indicating that the cache line corresponding to the network packet is to be evicted from the on-processor cache comprises setting at least one of a flag bit of the cache line and a temporal invalidation instruction to the cache line.

18. The method of claim 15, wherein the indicating that the cache line corresponding to the network packet is to be evicted from the on-processor cache comprises storing the cache line at a predetermined memory range of the on-processor cache, and wherein the predetermined memory range of the on-processor cache is located in a portion of the on-processor cache that is to be discarded first upon a cleanup of the on-processor cache.

19. The method of claim 15, further comprising:

discarding the cache line upon eviction of the cache line from the on-processor cache based on an indication that the cache line corresponding to the network packet is to be evicted from the on-processor cache.

20. One or more non-transitory, computer-readable storage media comprising a plurality of instructions stored thereon that in response to being executed cause a computing device to:

receive the network packet at an on-processor cache of the network device, wherein the on-processor cache comprises a plurality of cache lines;

store the network packet in the cache line of the on-processor cache;

process the network packet; and determine whether the network packet is required for subsequent processing;

indicate that the cache line that corresponds to the network packet is to be evicted from the on-processor cache in response to on a determination that the network packet is not required for subsequent processing.

21. The one or more non-transitory, computer-readable storage media of claim 20, wherein to indicate that the cache line that corresponds to the network packet is to be evicted from the on-processor cache comprises to set a flag bit of the cache line.

22. The one or more non-transitory, computer-readable storage media of claim 20, wherein to indicate that the cache line that corresponds to the network packet is to be evicted from the on-processor cache comprises to set a temporal invalidation instruction to the cache line.

23. The one or more non-transitory, computer-readable storage media of claim 20, wherein to indicate that the cache line that corresponds to the network packet is to be evicted from the on-processor cache comprises to store the cache line at a predetermined memory range of the on-processor cache, and wherein the predetermined memory range of the on-processor cache is located in a portion of the on-processor cache that is to be discarded first upon a cleanup of the on-processor cache.

24. The one or more non-transitory, computer-readable storage media of claim 20, wherein to determine whether the network packet is required for subsequent processing comprises to determine whether the network packet is required for subsequent processing based on a type of workload of the network packet.

25. The one or more non-transitory, computer-readable storage media of claim 20, further comprising a plurality of instructions that in response to being executed cause the computing device to:
    discard the cache line upon eviction of the cache line from the on-processor cache based on an indication that the cache line that corresponds to the network packet is to be evicted from the on-processor cache.

* * * * *